UNITED STATES PATENT OFFICE.

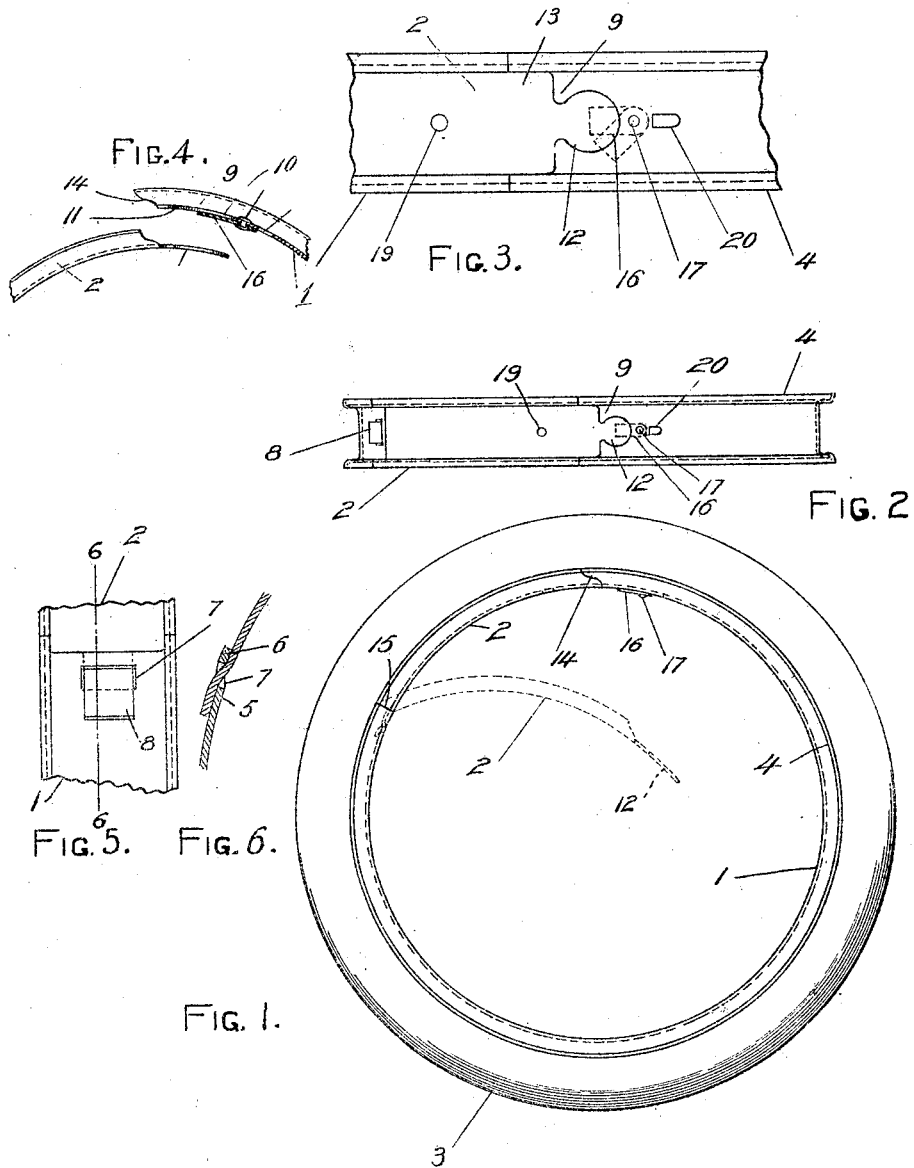

FRANK G. BERON, OF WATERBURY, CONNECTICUT, ASSIGNOR TO FRANCIS P. GUILFOILE, OF WATERBURY, CONNECTICUT.

DEMOUNTABLE RIM.

1,378,397. Specification of Letters Patent. Patented May 17, 1921.

Application filed November 30, 1917. Serial No. 204,684.

*To all whom it may concern:*

Be it known that I, FRANK G. BERON, a citizen of the United States of America, residing at Waterbury, in the county of New Haven and State of Connecticut, have invented certain new and useful Improvements in Demountable Rims, of which the following is a specification.

The present invention relates to demountable tire-carrying rims for vehicle wheels, and consists in the combinations and arrangements of elements hereinafter described and particularly set forth in the accompanying claim.

The purpose of the invention is to provide a rim which may be readily attached to or detached from the tire and fitted to the wheel in an easy and quickly performed manner; and one wherein the construction and arrangement will in no way detract from the advantages derived by having the rim and wheel proper constructed as separable and independent units, as is now the practice.

Another object of the invention is to produce a collapsible rim having means for interlocking the sections in a manner which will obviate the danger of breaking or slipping and which may enable the tire to be attached to the rim and the rim thereafter to the wheel in a simple and convenient manner and wherein the rim will possess the full strength and appearance of a one-piece rim.

The invention is disclosed by way of illustration in the accompanying drawings wherein:

Figure 1 is a front elevational view of the rim with the tire thereon;

Fig. 2, a top plan sectional view of the same;

Fig. 3, an enlarged detail view of the interlocking joint;

Fig. 4 a side elevational view of the said joint members;

Fig. 5, a detail view of the connecting joint, and

Fig. 6, a longitudinal sectional view taken on the line 6—6 of Fig. 5.

Referring to the construction in further detail and wherein like reference characters designate corresponding parts in the different views shown, the rim consists of a main portion 1, and a relatively shorter segmental portion 2, which forms therewith the complete rim for mounting on the tire 3. The rim thus constructed is provided with the usual side flanges 4, which receive the beads of the tire after the well known manner.

The end portion 5 of the rim part 1 is slightly offset as at 6 (see Fig. 6), and has a rectangular slot 7 formed therein to receive the tongue 8 formed on one end of and integrally with the rim segment 2, after the manner shown in Figs. 1, 5 and 6. This connection between the rim parts gives a substantially flexible joint which allows of the segment 2 being removed as indicated in Fig. 1 when the rim as a whole is to be collapsed for fitting to or removing from the tire.

The opposite portion 9 of the rim section 1 is cut away to provide a circular aperture 10 and a rectangular aperture 11 communicating therewith by a constricted opening to provide a neck. Said apertures 10 and 11 are adapted respectively to receive the disk portion 12 and reduced portion 13 of the segment 2, and thus form the interlocking joint between the rim sections.

The side flanges 4 of the rim portions are suitably cut away at the rim joints, as shown at 14 and 15 (see Figs. 1 and 4); and a locking plate 16 is pivotally mounted on the rim portion 1 at 17, and has for its purpose to fit closely against the surface of the tongue 12 when the rim sections are assembled, whereby to obtain a flush and even surface in the trough and on the rim as will be understood. It will be further noted that the said member 16 together with the flanged portions 14 will securely hold the rim segments against disassembling, and that the said portions may be disconnected only after the plate 16 has been moved to allow the tongue 12 to be withdrawn from its engaging slot.

The means for bringing the rim sections together consists of a suitable jack whose pivoted members engage respectively in the apertures 19 and 20 of the rim segments, but it is proposed as well to employ lugs instead of these apertures. In this latter instance, the members of the jack or other instrument serve to engage the lugs for spreading or drawing the parts together as required.

It is obvious that those skilled in the art may vary the details of construction and arrangement of parts without departing from the spirit of my invention, and therefore I do not wish to be limited to such features except as may be required by the claim.

Having thus described my invention what I claim as new and desire to protect by U. S. Letters Patent is:

A two part collapsible and demountable tire carrying rim for vehicle wheels comprising a main rim portion forming the greater part of the wheel's circumference and provided with a rectangular aperture and a circular aperture in its respective end portions completing the wheel's circumference, a segmental rim portion having a tongue fitting in said rectangular aperture and providing a pivotal joint, said segmental section also having at the outer end thereof a disk-tongue portion fitting within said circular aperture and providing a flush joint between the rim portions, said main and segmental rim sections having side flanges and a member pivotally mounted on the main rim portion adapted to engage the under surface of said disk-tongue and with said side flanges to secure the joint thereat, substantially as set forth.

In testimony whereof I affix my signature in the presence of two witnesses.

FRANK G. BERON.

Witnesses:
ANNA F. PRISAVAGE,
FRANK P. MCEVOY.